US012644740B2

(12) United States Patent
Schipper et al.

(10) Patent No.: US 12,644,740 B2
(45) Date of Patent: Jun. 2, 2026

(54) ULTRASONIC FLOWMETER

(71) Applicant: KROHNE AG, Basel (CH)

(72) Inventors: Willemijn Schipper, Papendrecht (NL); Jeroen Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 226 days.

(21) Appl. No.: 18/209,784

(22) Filed: Jun. 14, 2023

(65) Prior Publication Data

US 2023/0400337 A1 Dec. 14, 2023

(30) Foreign Application Priority Data

Jun. 14, 2022 (DE) ..................... 10 2022 114 985.4

(51) Int. Cl.
*G01F 1/66* (2022.01)
*G01F 1/663* (2022.01)
*G01F 1/667* (2022.01)

(52) U.S. Cl.
CPC .............. *G01F 1/662* (2013.01); *G01F 1/663* (2013.01); *G01F 1/667* (2013.01)

(58) Field of Classification Search
CPC ........... G01F 1/662; G01F 1/663; G01F 1/667
USPC ....................................................... 73/861.18
See application file for complete search history.

(56) References Cited

U.S. PATENT DOCUMENTS 3,109,112 A 10/1963 Lester
6,871,148 B2 3/2005 Morgen et al.
2006/0022680 A1* 2/2006 Suginouchi ............... G01F 1/66 324/635
2010/0011866 A1 1/2010 Van Klooster et al.
2017/0307426 A1* 10/2017 van Klooster ......... H04R 17/00

FOREIGN PATENT DOCUMENTS

| | | | |
|---|---|---|---|
| CN | 109073431 | A | 12/2018 |
| DE | 4011526 | A1 | 10/1991 |
| DE | 102010064117 | A1 | 6/2012 |
| DE | 102015113561 | A1 | 2/2017 |
| DE | 102016111133 | A1 | 12/2017 |

* cited by examiner

*Primary Examiner* — Nathaniel T Woodward
(74) *Attorney, Agent, or Firm* — Muncy, Geissler, Olds & Lowe, P.C.

(57) ABSTRACT

An ultrasonic flowmeter includes first and second ultrasonic transducers and a control and evaluation unit. The first and second ultrasonic transducers include respective transducer housings that are at least partially capable of mechanical oscillation and are at least partially excited to mechanical oscillations for signal emission or signal coupling. The control and evaluation unit controls the first and second ultrasonic transducers and evaluates a measurement signal characterizing a flow rate of a medium. The first ultrasonic transducer has a mechanical oscillation influencing element that influences oscillation behavior of the first ultrasonic transducer such that natural frequencies of the first ultrasonic transducer are frequency-shifted relative to natural frequencies of the second ultrasonic transducer. The measurement signal characterizing the flow rate, which results from the transmitted ultrasonic signal passing through the first and second ultrasonic transducers, is more broadband than after passing through only one of the first and second ultrasonic transducers.

13 Claims, 4 Drawing Sheets

ULTRASONIC FLOWMETER

TECHNICAL FIELD

The invention relates to an ultrasonic flowmeter for determining the flow of a medium, with at least one ultrasonic transducer pair comprising a first ultrasonic transducer and a second ultrasonic transducer, wherein the first ultrasonic transducer and the second ultrasonic transducer are designed for transmitting and/or for receiving ultrasonic signals, wherein the first ultrasonic transducer comprises a first transducer housing and a first transducer element arranged in the first transducer housing for generating and/or for receiving ultrasonic signals, wherein the second ultrasonic transducer has a second transducer housing and a second transducer element arranged in the second transducer housing for generating and/or receiving ultrasonic signals, wherein the first transducer housing and the second transducer housing are at least partially designed to be mechanically capable of oscillation and are at least partially excited to mechanical oscillations for signal emission or signal coupling, and having a control and evaluation unit for controlling the ultrasonic transducers and for evaluating a measurement signal characterizing the flow rate.

BACKGROUND

Ultrasonic flowmeters of the type in question are known in a large number from the prior art. Measuring systems used in the prior art generally employ at least two ultrasonic transducers of identical construction, wherein at least one of the ultrasonic transducers is designed as a transmitter and one of the ultrasonic transducers is designed as a receiver. In most cases, both ultrasonic transducers can be both transmitters and receivers.

In addition, essentially two types of ultrasonic transducers are known from the prior art, namely, firstly, ultrasonic transducers in which the transducer element is arranged essentially directly on an ultrasound window of the ultrasonic transducer, via which the ultrasonic signals are transmitted into the medium, and which do not have mechanical oscillators that can be explicitly excited to oscillations and dominate the radiation behavior of the ultrasonic transducer. Such an ultrasonic transducer is known, for example, from U.S. Pat. No. 7,992,439 B2. The radiation behavior of such ultrasonic transducers is essentially determined by the electrical excitation of the transducer element.

On the other hand, ultrasonic transducers are known, for example from DE 10 2016 107 471 B3, in which the transducer housings are designed to be at least partially capable of oscillation and whose housings are excited to mechanical oscillations for signal coupling or signal generation. The natural frequencies of such an ultrasonic transducer are directly dependent on the structural design of the ultrasonic transducer, so that the oscillation behavior is dominated by the structural design.

A disadvantage of such a measuring system is that the measurement signal to be evaluated by the control and evaluation unit is narrow-band, since both the ultrasonic transducer acting as transmitter and the ultrasonic transducer acting as receiver exhibit the same oscillation behavior, in particular have the same natural frequencies. A narrow-band measurement signal is problematic to evaluate, so that instead of a narrow-band measurement signal, one strives to generate a measurement signal with a wider bandwidth. In ultrasonic transducers of the first type, this is implemented, for example, by generating additional natural frequencies by means of electronic components. A disadvantage of the solution known from the prior art is that it is susceptible to interference due to the electronic components and, in addition, a temperature dependence of the measurement signal can be observed due to the electronic components.

Since, in the case of ultrasonic transducers of the second type, the oscillation behavior and, in particular, the natural frequencies of the ultrasonic transducer are dominated by the constructive design, such an influencing of the oscillation behavior by electronic components cannot be easily implemented to the desired extent.

SUMMARY

Accordingly, the object of the invention is to provide an ultrasonic flowmeter in which the disadvantages known from the prior art are reduced.

According to the invention, the object is initially and essentially achieved, namely with the disclosed features, in that at least the first ultrasonic transducer has a first mechanical oscillation influencing element for influencing the oscillation behavior of the first ultrasonic transducer, and that the mechanical oscillation influencing element influences the oscillation behavior of the first ultrasonic transducer in such a manner that the natural frequencies of the first ultrasonic transducer are frequency-shifted relative to the natural frequencies of the second ultrasonic transducer, in such a way that the measurement signal characterizing the flow, which results from the transmitted ultrasonic signal passing through the first ultrasonic transducer and the second ultrasonic transducer, is broadband, in any case more broadband than after passing through only one of the ultrasonic transducers.

According to the invention, it has been recognized that the oscillation behavior of at least the first ultrasonic transducer can be influenced in a simple manner by an additional mechanical oscillation influencing element. When the reference is made to a mechanical oscillation influencing element, it is thereby clarified that according to the invention the oscillation behavior is not influenced by electronic components or any other electrical control of the transducer element, but by an additional "mass" which mechanically influences the oscillation behavior of the ultrasonic transducer.

In order to achieve the desired effect of expanding the measurement signal to a broadband measurement signal, it is necessary that the natural frequencies of the first ultrasonic transducer and the natural frequencies of the second ultrasonic transducer are in a coordinated ratio to each other. In particular, the natural frequencies must not be too far apart. It is particularly preferred according to the invention that the natural frequencies of the first ultrasonic transducer and the second ultrasonic transducer differ from each other in the range of 15 to 30 percent. According to the invention, it has been recognized that in this way an optimal broadening of the measurement signal, i.e., an optimal broadband can be generated.

According to the invention, in one design it is provided that the mechanical oscillation influencing element is at least indirectly connected to the transducer housing of the first ultrasonic transducer. This can be implemented in various ways.

In a first variation according to the invention, the mechanical oscillation influencing element is detachably connected to the first transducer housing. This offers the advantage that the mechanical oscillation influencing element can be replaced in a simple manner. Particularly preferably, the mechanical oscillation influencing element is connected to the transducer housing by a plug-in connection or a screw connection. Also preferably, in another variation, the connection between the transducer housing and the oscillation influencing element is implemented by a snap-in connection or a bayonet connection.

In another design according to the invention, the mechanical oscillation influencing element is non-detachably connected to the first transducer housing. Particularly preferably, such a non-detachable connection is implemented by a welded connection or a press connection. In an alternative variation, the mechanical oscillation influencing element is designed integrally with the transducer housing. In this variation, the mechanical oscillation influencing element and the transducer housing are thus made from a single workpiece. The implementation of a non-detachable connection between the oscillation influencing element and the transducer housing has the advantage that the oscillation influencing element cannot detach from the transducer housing due to the oscillations of the transducer housing during operation of the ultrasonic transducer and cannot change its position relative to the transducer housing, which could change the oscillation behavior.

In a particularly preferred design of the ultrasonic flowmeter according to the invention, the mechanical oscillation influencing element is arranged at the end of the ultrasonic transducer facing the medium.

The mechanical oscillation influencing element itself can be implemented in different ways according to the invention. In a very particularly preferred design, the mechanical oscillation influencing element is designed as a sleeve. Particularly preferably, in one variation, the sleeve is designed as a spring element. Further preferably, the sleeve is then implemented as a spiral spring, a torsion spring, a wave spring or a plate spring.

In another design according to the invention, the mechanical oscillation influencing element is designed as a mass ring and further preferably has a closed surface in the circumferential direction.

A further design according to the invention is characterized in that the oscillation influencing element designed as a sleeve has vertical material recesses. These material recesses can be implemented, for example, as slots. Particularly preferably, the material slots are arranged perpendicular to the circumferential direction of the sleeve. Further preferably, several vertical material slots are provided and, furthermore, these material slots are arranged uniformly over the circumference of the sleeve.

To further influence the oscillation behavior of the first ultrasonic transducer, in one design a damping material is arranged between the transducer housing and the mechanical oscillation influencing element. The damping material is implemented, for example, as a damping foil. The use of graphite is particularly suitable as a damping material. However, the invention is not limited to the use of graphite.

Previously, it has been described that the first ultrasonic transducer comprises a mechanical oscillation influencing element so as to achieve that the natural frequencies of the first ultrasonic transducer and the natural frequencies of the second ultrasonic transducer are different from each other. In a very particularly preferred design of the ultrasonic flowmeter according to the invention, the second ultrasonic transducer also comprises a mechanical oscillation influencing element, namely a second mechanical oscillation influencing element for influencing the oscillation behavior of the second ultrasonic transducer. The second oscillation influencing element is at least indirectly connected to the second transducer housing. In order to further obtain the effect according to the invention, namely the expansion of the measurement signal to a broadband measurement signal, the first mechanical oscillation influencing element and the second mechanical oscillation influencing element are configured differently, i.e. differently from each other.

In a particularly preferred design, the second mechanical oscillation influencing element is detachably connected to the transducer housing of the second ultrasonic transducer. Particularly preferably, the mechanical oscillation influencing element is connected to the transducer housing by a plug-in connection or a screw connection. Also preferably, in another variation, the connection between the transducer housing and the oscillation influencing element is implemented by a snap-in connection or a bayonet connection. In an alternative design, the second mechanical oscillation influencing element is non-detachably connected to the transducer housing of the second ultrasonic transducer. Particularly preferably, such a non-detachable connection is implemented by a welded connection or a press connection. In an alternative variation, the mechanical oscillation influencing element is designed integrally with the transducer housing.

According to the invention, there are various variations for the design of the second mechanical oscillation influencing element. Particularly preferably, the second mechanical connecting element is designed as described above in connection with the first mechanical oscillation influencing element. All the explanations previously described in connection with the first oscillation influencing element also apply accordingly to the second mechanical oscillation influencing element. In particular, the second mechanical oscillation influencing element can be designed as a sleeve, further preferably as a spring element or as a mass ring, or as a sleeve with vertical recesses.

In the ultrasonic flowmeter according to the invention, the following situations may be implemented, for example:

The first ultrasonic transducer has a mechanical oscillation influencing element, the second ultrasonic transducer does not have a mechanical oscillation influencing element.

The first ultrasonic transducer has a mechanical oscillation influencing element, and the second ultrasonic transducer has a mechanical oscillation influencing element that is configured differently from the mechanical oscillation influencing element of the first ultrasonic transducer.

If both the first ultrasonic transducer and the second ultrasonic transducer have a mechanical oscillation influencing element, both ultrasonic transducers may, for example, have mechanical oscillation influencing elements configured as spring elements, wherein the two spring elements are implemented differently. In another design, both ultrasonic transducers can have vibration influencing elements implemented as mass rings, wherein the mass rings can have, for example, different thicknesses or longitudinal extensions in order to be implemented differently from one another. It is also conceivable that both ultrasonic transducers have sleeves with vertical material slots as mechanical oscillation influencing elements. Here, for example, the material slots can be designed differently or provided in different numbers. Also preferred are designs in which the mechanical oscillation influencing element of the first ultrasonic transducer is designed as a spring element and the mechanical oscillation influencing element of the second ultrasonic transducer is designed as a sleeve with a closed surface or as a sleeve with vertical material slots, or a design in which the mechanical oscillation influencing element of the first ultrasonic transducer is designed as a sleeve with a closed surface and the mechanical oscillation influencing element of the second ultrasonic transducer is designed as a sleeve with vertical material slots.

BRIEF DESCRIPTION OF THE DRAWINGS

In detail, there are a multitude of possibilities for designing and further developing the ultrasonic flowmeter according to the invention. For this purpose, reference is made to the drawings.

DETAILED DESCRIPTION

Figure 1:
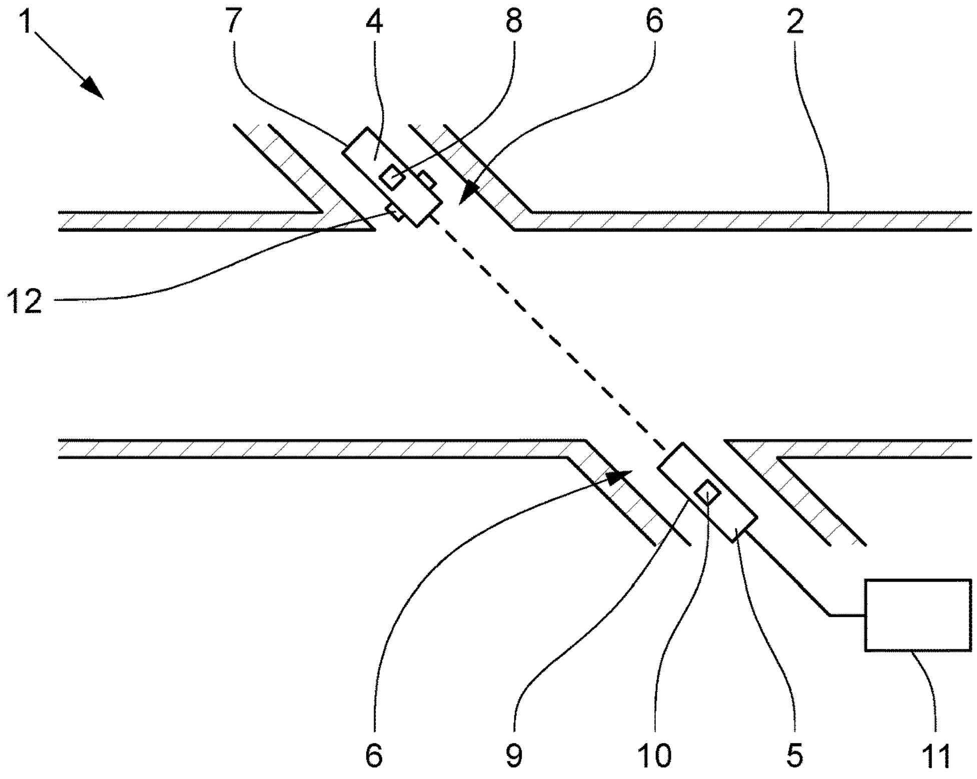
FIG. 1 is a schematic representation of a first variation of an ultrasonic flowmeter.

FIG. 1 shows a schematic representation of an ultrasonic flowmeter 1 designed to determine the flow rate of a medium flowing through the measuring tube 2. The ultrasonic flowmeter 1 has a pair of ultrasonic transducers 3 comprising a first ultrasonic transducer 4 and a second ultrasonic transducer 5. Both the first ultrasonic transducer 4 and the second ultrasonic transducer 5 are designed to transmit and receive ultrasonic signals. In the illustrated design, the two ultrasonic transducers 4, 5 are arranged in transducer pockets 6 on opposite sides of the measuring tube 2. The first ultrasonic transducer 4 has a first transducer housing 7 in which a first transducer element 8 is arranged for generating and/or for receiving ultrasonic signals. The second ultrasonic transducer 5 has a second transducer housing 9 in which a second transducer element 10 is arranged. Both the first transducer housing 7 and the second transducer housing 9 are designed to be at least partially capable of mechanical oscillation and are at least partially excited to mechanical oscillation for signal emission and/or signal coupling. In addition, the ultrasonic flowmeter 1 has a control and evaluation unit 11 for controlling the ultrasonic transducers and for evaluating a measurement signal characterizing the flow.

The first ultrasonic transducer 4 has a first mechanical oscillation influencing element 12, which is used to influence the oscillation behavior of the first ultrasonic transducer 4. The mechanical oscillation influencing element 12 influences the oscillation behavior of the first ultrasonic transducer 4 in such a way that the natural frequencies of the first ultrasonic transducer 4 are frequency-shifted relative to the natural frequencies of the second ultrasonic transducer 5, in such a way that the measurement signal characterizing the flow, which results from the transmitted ultrasonic signal passing through the first ultrasonic transducer 4 and the second ultrasonic transducer 5, is broadband, in any case more broadband than after passing through only one of the ultrasonic transducers 4, 5. The resulting broader-band measurement signal is easier to process on a measurement-based basis than a narrower-band measurement signal that would result from passing through only one of the ultrasonic transducers 4, 5, or two identically designed ultrasonic transducers 4, 5.

Figure 2:
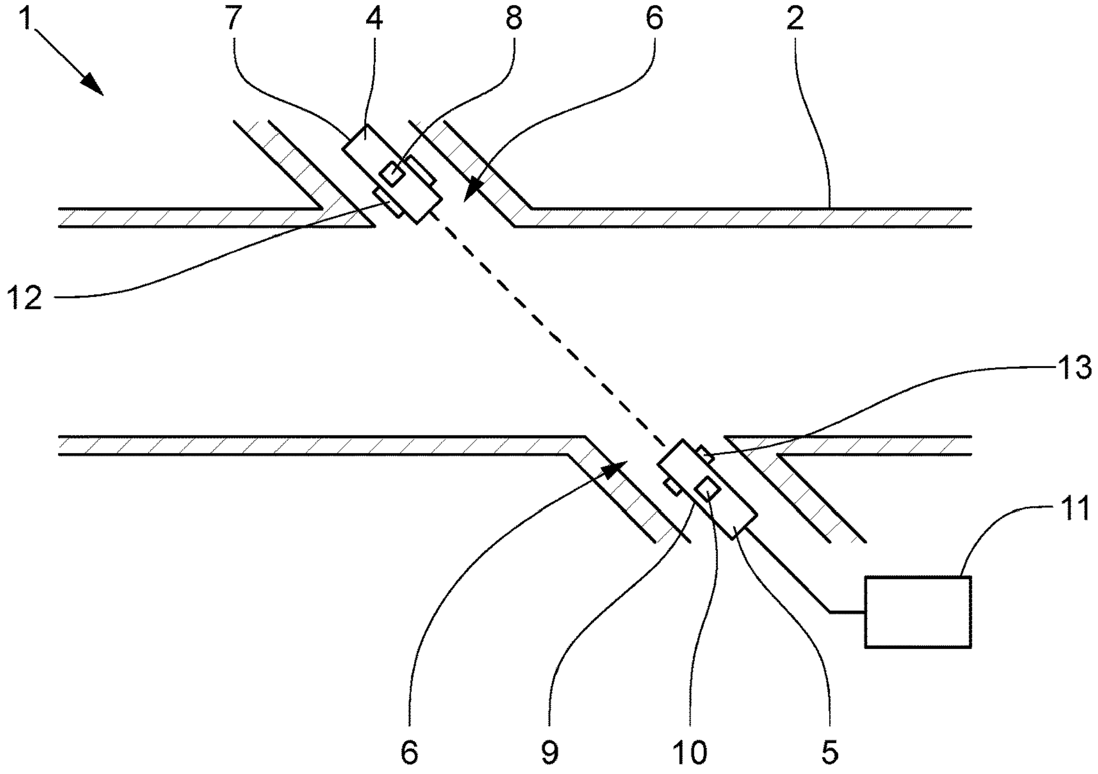
FIG. 2 is a schematic representation of a second variation of an ultrasonic flowmeter.

FIG. 2 shows a schematic representation of a further design of an ultrasonic flowmeter 1, which differs from the variation shown in FIG. 1 in that the second ultrasonic transducer 5 also has a mechanical oscillation influencing element 13. The mechanical oscillation influencing element 13 of the second ultrasonic transducer 5 has a different design than the mechanical oscillation influencing element 12 of the first ultrasonic transducer 4. Thus, the effect of the wider-band measurement signal can also be achieved in this design.

Figure 3:
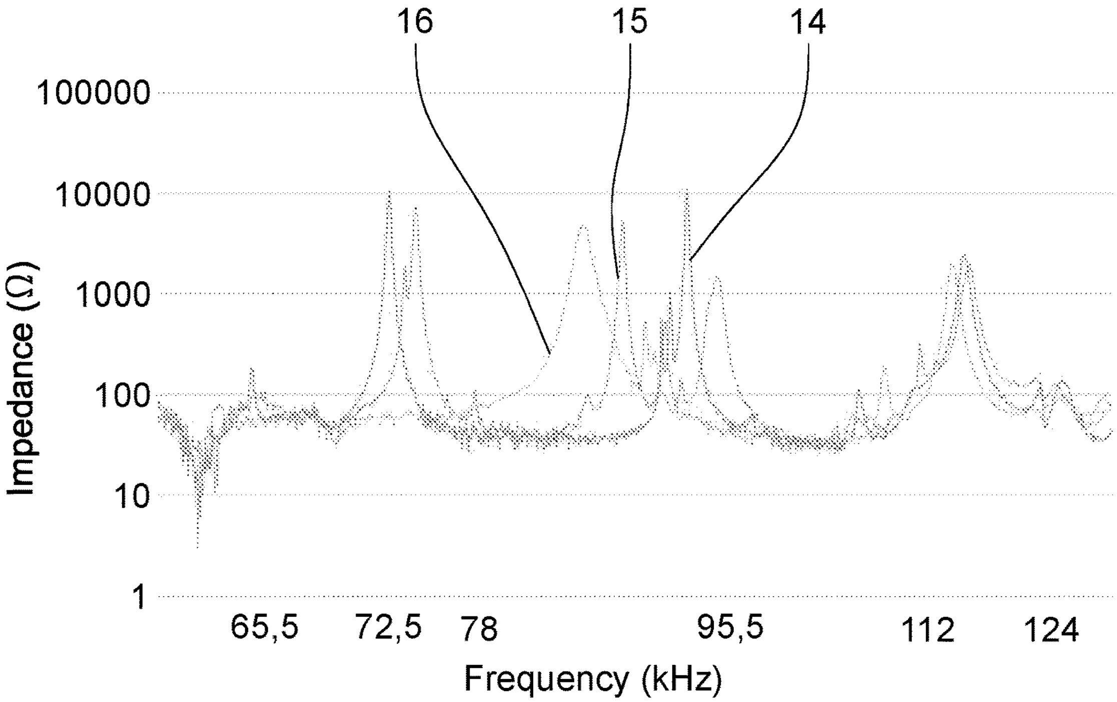
FIG. 3 is a representation of the frequency spectra of various ultrasonic transducers.

FIG. 3 shows a diagram in which three frequency spectra 14, 15, 16 of an ultrasonic transducer are shown, by which the influence of various mechanical oscillation influencing elements 12, 13 on the frequency spectrum of an ultrasonic transducer, in particular on the natural frequencies of an ultrasonic transducer, is illustrated. The various frequency spectra 14, 15, 16 show the oscillation behavior of an ultrasonic transducer with various oscillation influencing elements 12, 13. The frequency spectrum 14 shows the frequency spectrum of an ultrasonic transducer 4 without an additional mechanical oscillation influencing element 12, 13. The natural frequencies are presently at frequencies of 72.4 kHz and 92.0 kHz. The frequency spectrum 15 shows the frequency spectrum of an ultrasonic transducer with an additional mechanical oscillation influencing element 12, in this case an oscillation influencing element 12 as shown in FIG. 8. The natural frequencies here are at 74.0 kHz and 87.5 kHz, i.e. they are shifted in frequency compared to the natural frequencies of the ultrasonic transducer 4 without an oscillation influencing element. The frequency spectrum 16 shows the frequency spectrum of an ultrasonic transducer with an additional mechanical oscillation influencing element, which is, however, designed differently from the previously mentioned oscillation influencing element, namely in the present case as the oscillation influencing element shown in FIG. 7. In the frequency spectrum 16, the natural frequency is 84.7 kHz. It can also be seen that the natural frequency peak is widened.

Figure 4:
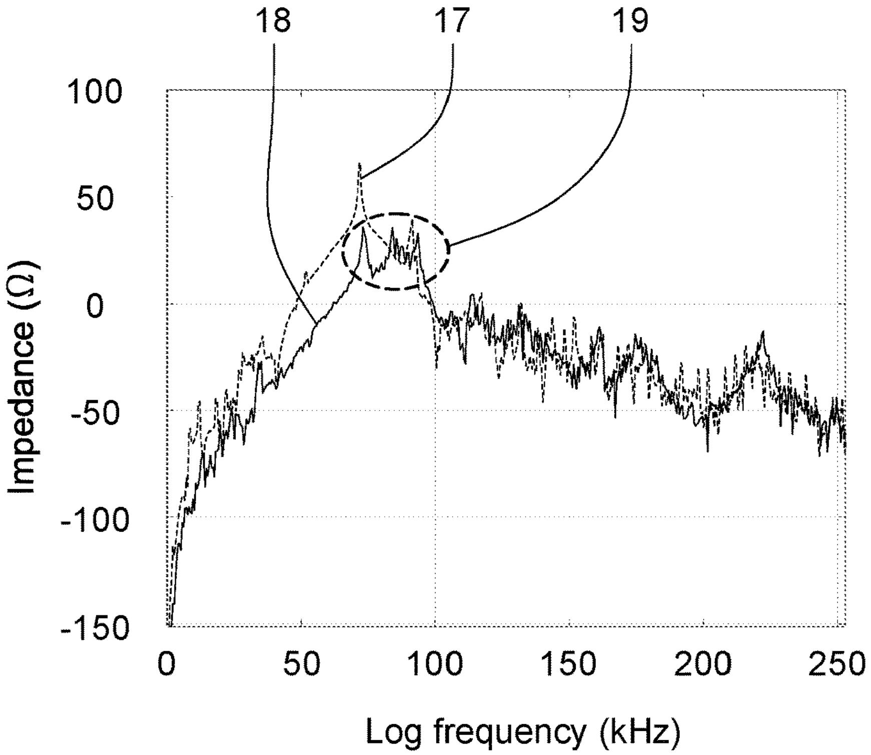
FIG. 4 is a representation of measurement signals.

FIG. 4 shows an illustration of two different measurement signals 17, 18. Measurement signal 17 here is a measurement signal of an ultrasonic flowmeter 1 in which both ultrasonic transducers 4, 5 have no mechanical oscillation influencing element and are designed identically. The measurement signal 18, on the other hand, is the measurement signal of an ultrasonic flowmeter 1 in which the first ultrasonic transducer 4 has a first mechanical oscillation influencing element 12 and the second ultrasonic transducer 5 has a second oscillation influencing element 13 of a different design. In FIG. 4, it can be clearly seen that the measurement signal 18 characterizing the flow rate, which results from the ultrasonic signal transmitted to the first ultrasonic transducer 4 with the first oscillation influencing element 12 and the second ultrasonic transducer 5 with the second oscillation influencing element 13, is more broadband than the measurement signal 17. In particular, the measurement signal 18 forms a plateau 19 in the range between about 70 kHz and 90 kHz. The broadband measurement signal 18 can be captured much better on a measurement-based basis than the narrowband measurement signal 17.

Figure 5:
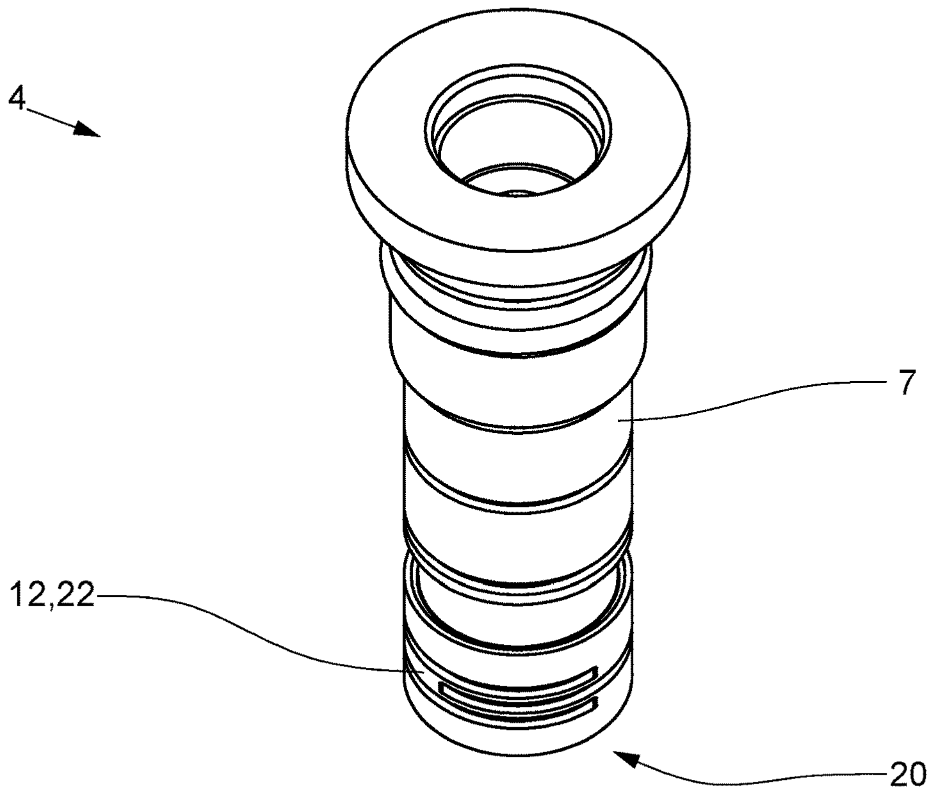
FIG. 5 is a representation of a first variation of an ultrasonic transducer.

FIG. 5 shows a top view of an ultrasonic transducer 4. The ultrasonic transducer 4 has a transducer element 8 for generating and/or receiving ultrasonic signals, which is arranged in the transducer housing 7 and is not visible in FIG. 5. In addition, the ultrasonic transducer 4 has a mechanical oscillation influencing element 12, which is detachably connected to the transducer housing 7, namely by a screw connection. In contrast, in the ultrasonic transducer 4 shown in FIG. 1, the oscillation influencing element 12 is non-detachably connected to the transducer housing 7, namely welded. Moreover, it can be seen that the mechanical oscillation influencing element 12 is arranged at the end 20 of the ultrasonic transducer 4 facing the medium. Furthermore, FIG. 5 shows an oscillation influencing element 12 implemented as a sleeve 21 and, moreover, as a spring element 22.

Figure 6:
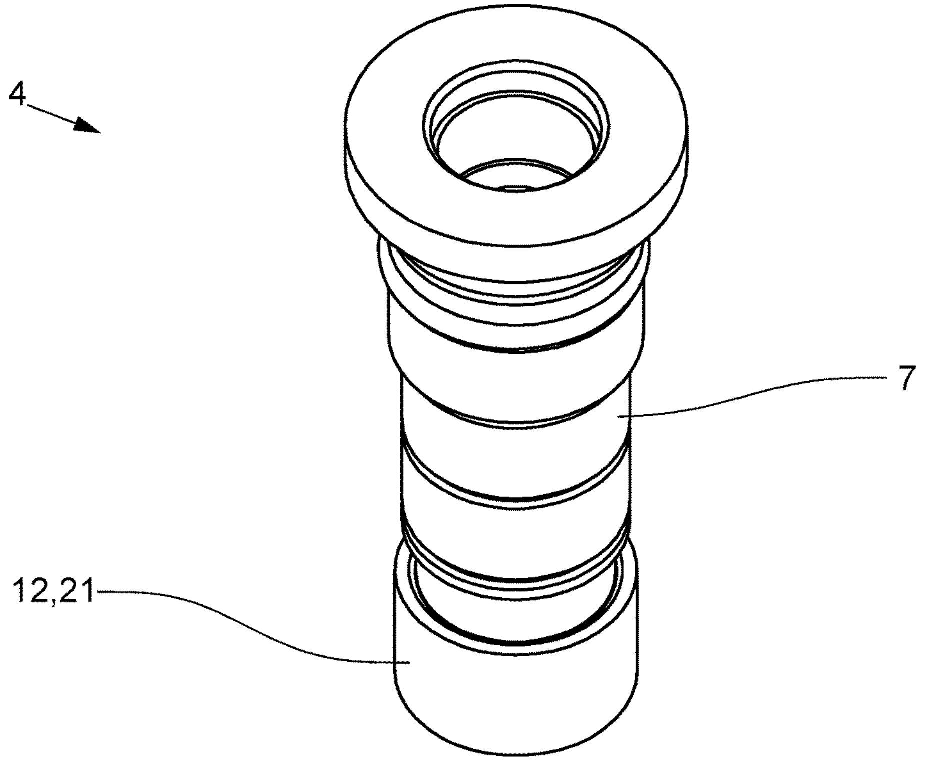
FIG. 6 is a representation of a second variation of an ultrasonic transducer.

FIG. 6 shows a representation of a further design of an ultrasonic transducer 4 in plan view. In contrast to the design shown in FIG. 5, the mechanical oscillation influencing element 12 is designed as a sleeve 21 implemented by a mass ring 23. The mass ring 23 has a closed surface in the circumferential direction. The mass ring 23 is connected to the transducer housing 7 by a press connection.

Figure 7:
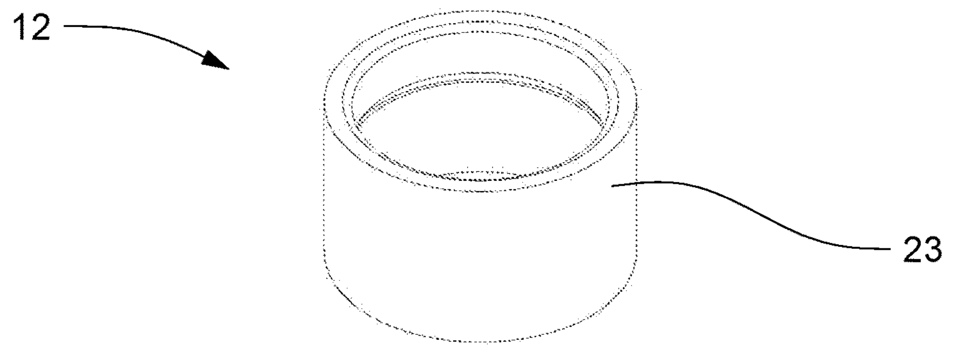
FIG. 7 is a representation of a first variation of a mechanical oscillation influencing element.
Figure 8:
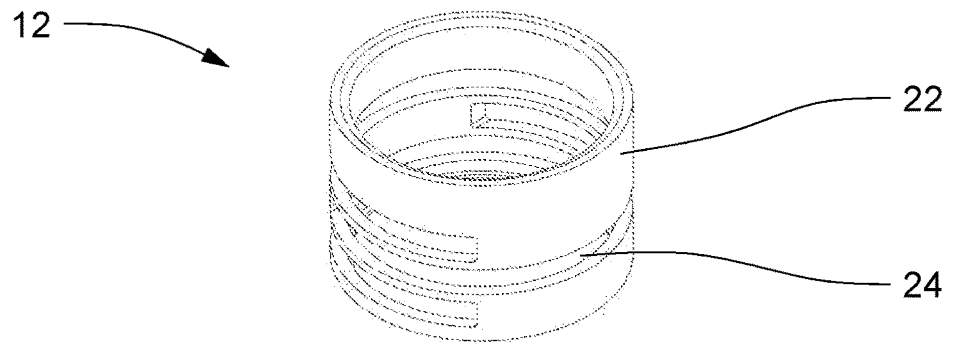
FIG. 8 is a representation of a second variation of a mechanical oscillation influencing element.
Figure 9:
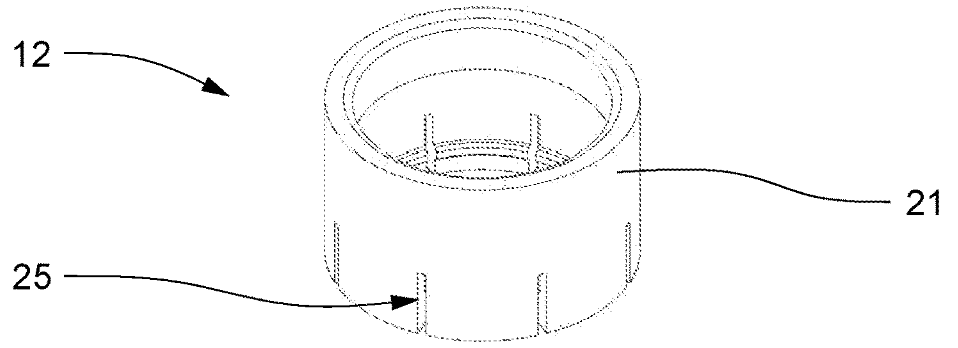
FIG. 9 is a representation of a third variation of a mechanical oscillation influencing element.

FIGS. 7, 8 and 9 show different variations of a mechanical oscillation influencing element 12. The mechanical oscillation influencing element 12 shown in FIG. 7 is implemented as a mass ring 23. The mechanical oscillation influencing element 12 shown in FIG. 8, on the other hand, is implemented as a spring element 22 and, in contrast to the oscillation influencing element 12 designed as a mass ring 23, has material recesses 24 that extend at least partially in the circumferential direction. The oscillation influencing element 12 shown in FIG. 9, on the other hand, is implemented as a sleeve 21, which has vertical material slots 25 perpendicular to the circumferential direction of the sleeve 21.

The invention claimed is:

1. An ultrasonic flowmeter for determining the flow rate of a medium, comprising:

at least one ultrasonic transducer pair including:

a first ultrasonic transducer; and a second ultrasonic transducer;

wherein the first ultrasonic transducer and the second ultrasonic transducer are designed for transmitting and/or receiving ultrasonic signals;

wherein the first ultrasonic transducer includes a first transducer housing and a first transducer element arranged in the first transducer housing for generating and/or for receiving ultrasonic signals;

wherein the second ultrasonic transducer includes a second transducer housing and a second transducer element arranged in the second transducer housing for generating and/or receiving ultrasonic signals; and wherein the first transducer housing and the second transducer housing are designed to be at least partially capable of mechanical oscillation and are at least partially excited to mechanical oscillations for signal emission or signal coupling; and a control and evaluation unit for controlling the ultrasonic transducers and for evaluating a measurement signal characterizing the flow rate;

wherein at least the first ultrasonic transducer has a first mechanical oscillation influencing element for influencing the oscillation behavior of the first ultrasonic transducer;

wherein the first mechanical oscillation influencing element influences the oscillation behavior of the first ultrasonic transducer only mechanically by adding an additional mass; and wherein the first mechanical oscillation influencing element influences the oscillation behavior of the first ultrasonic transducer in such a manner that the natural frequencies of the first ultrasonic transducer are frequency-shifted relative to the natural frequencies of the second ultrasonic transducer such that the measurement signal characterizing the flow rate, which results from the transmitted ultrasonic signal passing through the first ultrasonic transducer and the second ultrasonic transducer, is more broadband than after passing through only one of the ultrasonic transducers.

2. The ultrasonic flowmeter according to claim 1, wherein the natural frequencies of the first ultrasonic transducer and the second ultrasonic transducer deviate from each other in a range of 15 percent to 30 percent.

3. The ultrasonic flowmeter according to claim 1, wherein the first mechanical oscillation influencing element is detachably connected to the first transducer housing by at least one of a plug-in connection, a screw connection, a snap-in connection and a bayonet connection.

4. The ultrasonic flowmeter according to claim 1, wherein the first mechanical oscillation influencing element is non-detachably connected to the first transducer housing by at least one of a welded connection and a press connection; or wherein the first mechanical oscillation influencing element is designed integrally with the transducer housing.

5. The ultrasonic flowmeter according to claim 1, wherein the first mechanical oscillation influencing element is arranged at the end of the ultrasonic transducer facing the medium.

6. The ultrasonic flowmeter according to claim 1, wherein the first mechanical oscillation influencing element is designed as a sleeve.

7. The ultrasonic flowmeter according to claim 6, wherein the sleeve is designed as at least one of a spiral spring, a torsion spring, a wave spring and a plate spring.

8. The ultrasonic flowmeter according to claim 6, wherein the sleeve is designed as a mass ring; and wherein the mass ring has a closed surface in the circumferential direction.

9. The ultrasonic flowmeter according to claim 6, wherein the sleeve has vertical material slots; and wherein the material slots are arranged perpendicular to the circumferential direction.

10. The ultrasonic flowmeter according to claim 1, wherein a damping material is arranged between the transducer housing and the first mechanical oscillation influencing element.

11. The ultrasonic flowmeter according to claim 1, wherein the second ultrasonic transducer has a second mechanical oscillation influencing element for influencing the oscillation behavior of the second ultrasonic transducer;

wherein the second mechanical oscillation influencing element is detachably or non-detachably connected to the second transducer housing; and wherein the second mechanical oscillation influencing element is designed such that at least one of:

the second mechanical oscillation influencing element is arranged at the end of the ultrasonic transducer facing the medium;

the second mechanical oscillation influencing element is designed as a sleeve, and the sleeve is at least one of a spiral spring, a torsion spring, a wave spring and a plate spring;

the second mechanical oscillation influencing element is designed as a sleeve, and the sleeve is a mass ring having a closed surface in the circumferential direction; and the second mechanical oscillation influencing element is designed as a sleeve, and the sleeve has vertical material slots arranged perpendicular to the circumferential direction.

12. The ultrasonic flowmeter according to claim 1, wherein a damping foil is arranged between the transducer housing and the first mechanical oscillation influencing element.

13. The ultrasonic flowmeter according to claim 1, wherein a graphite damping material is arranged between the transducer housing and the first mechanical oscillation influencing element.

* * * * *